United States Patent
Lee et al.

(10) Patent No.: US 6,612,808 B2
(45) Date of Patent: Sep. 2, 2003

(54) ARTICLE WALL WITH INTERRUPTED RIBBED HEAT TRANSFER SURFACE

(75) Inventors: Ching-Pang Lee, Cincinnati, OH (US); Glenn Herbert Nichols, Mason, OH (US)

(73) Assignee: General Electric Company, Schenectady, NY (US)

( * ) Notice: Subject to any disclaimer, the term of this patent is extended or adjusted under 35 U.S.C. 154(b) by 91 days.

(21) Appl. No.: 09/997,183

(22) Filed: Nov. 29, 2001

(65) Prior Publication Data

US 2003/0099541 A1 May 29, 2003

(51) Int. Cl.[7] .............................. F01D 5/18; F01D 25/14
(52) U.S. Cl. ...................... 415/175; 415/178; 416/96 R
(58) Field of Search ................................. 165/181, 183, 165/185; 415/175, 177, 178; 416/96 R

(56) References Cited

U.S. PATENT DOCUMENTS

| | | | |
|---|---|---|---|
| 3,864,056 A | * 2/1975 | Gabriel et al. | 415/178 |
| 5,071,313 A | 12/1991 | Nichols | 415/134 |
| 5,353,865 A | 10/1994 | Adiutori et al. | 165/133 |
| 5,560,424 A | * 10/1996 | Ogawa | 165/183 |
| 5,562,408 A | 10/1996 | Proctor et al. | 415/173.1 |
| 5,992,513 A | * 11/1999 | Suzuki et al. | 165/133 |
| 6,142,734 A | 11/2000 | Lee | 416/97 R |

OTHER PUBLICATIONS

"Effects of Tubulator Profile and Spacing on Heat Transfer and Friction in a Channel," by Taslim and Spring; Journal of Thermophysics and Heat Transfer, vol. 8, No. 3, Jul.–Sep. 1994.

* cited by examiner

Primary Examiner—Edward K. Look
Assistant Examiner—Richard A. Edgar
(74) Attorney, Agent, or Firm—William Scott Ande; Lee H. Sachs

(57) ABSTRACT

An article, for example a turbine engine component such as a shroud, airfoil, etc., comprises a wall having a first wall surface subject to a first temperature, for example from the flow stream of the engine. The wall includes a second wall surface, substantially opposite the first wall surface, for exposure to a cooling fluid, for example cooling air. The second wall surface includes a plurality of adjacent ribs protruding from the second wall surface to facilitate transfer of heat from the second wall surface. The ribs comprise a plurality of elongated rib portions each spaced apart one from another across a gap between rib portions, the gaps having a gap length in the range of about 0.002–0.05".

11 Claims, 2 Drawing Sheets

ARTICLE WALL WITH INTERRUPTED RIBBED HEAT TRANSFER SURFACE

BACKGROUND OF THE INVENTION

This invention relates to heat transfer through an article wall. More particularly, it relates to an article, for example a turbine engine component, having a first wall surface exposed to or affected by a fluid at a first temperature, for example the flowstream of the engine. The first wall surface substantially is opposite a second wall surface desired to be reduced, for example by cooling air, by heat transfer through the wall to a second temperature lower than the first temperature.

Components of a gas turbine engine, for example in the turbine section of the engine, operate in or are exposed or subjected to a heated stream of gas and/or products of combustion. Typical components include stationary shrouds or shroud segments and their supporting structure, blading members such as stationary or rotating airfoils of blades, vanes or struts, as well as walls of internal fluid flow passages, generally downstream of the combustor section of the engine.

Engine designers desire to operate a gas turbine engine at relatively high temperatures most efficient for the materials used in generating and extracting energy from the fluid produced. However, such elevated temperatures frequently are higher than those at which the materials from which components are constructed can withstand alone without compromise of mechanical and/or physical properties, or distortion of such materials. Consequently, use has been made of various coatings and/or of convection cooling air impinging on or flowing about and/or within a component to lower a wall temperature and reduce the damaging effect of excessive heat.

The heat transfer rate from a convection-cooled surface, to reduce its surface temperature, is linearly proportional to the surface area and its surface heat transfer coefficient. Accordingly, there has been reported a variety of surface configurations to increase such surface area. For example, in U.S. Pat. No. 5,353,865 —Adiutori et al. patented Oct. 11, 1994), a surface has been textured with a plurality of spaced apart protuberances such as dimples or ridges to increase the surface area for enhanced heat transfer therefrom, reducing the surface temperature. Another example of wall ridges and grooves to increase surface area for heat transfer enhancement is shown in U.S. Pat. No. 6,142,734—Lee (patented Nov. 7, 2000). In general, these kinds of structures sometimes are referred to a turbulators. The effects of turbulators are more extensively discussed in "Effects of Turbulator Profile and Spacing on Heat Transfer and Friction in a Channel" by Taslim and Spring, (Journal of Thermophysics and Heat Transfer, Vol. 8, No. 3, July–September 1994).

Although the above general type of surface protuberances can enhance heat transfer from a surface, manufacture of such structures as dimples of a size most desirable for heat transfer, typically by precision casting, has resulted in relatively low casting yields. For example, it is desired for enhanced heat transfer to cast such dimples with a diameter and height in the range of about 0.025–0.040". However, such small dimple size has resulted in poor casting yield, for example because of problems relating to poor filling of casting mold cavities. Grooves or ribs of the generally continuous type described in the above identified Lee patent, generally continuous in the longitudinal direction, are easier to cast in a smaller size. However, when cooling fluid flows generally in parallel along the continuous groove or rib length, an insulating boundary layer of cooling fluid grows or extends along such a surface resulting in a poorer heat transfer coefficient. It is desirable to have a protruding elongated rib type surface configuration, preferably of a relatively small dimensional size, that has heat transfer enhancement as a result of disruption of such an insulating boundary layer. In addition, a rib with a relatively small size cross sectional dimension can be precision cast with a relatively high yield rate.

BRIEF SUMMARY OF THE INVENTION

The present invention, in one form, comprises a wall having a first wall surface subject to a first temperature, and a substantially opposite second wall surface for exposure to a cooling fluid for reducing the second wall surface to a second temperature less than the first temperature. The second wall surface includes a plurality of spaced apart ribs protruding from the second wall surface to facilitate transfer of heat from the second wall surface. To enhance heat transfer from the ribs by disrupting boundary layer insulation problems and yet enable a good casting yield, the ribs are interrupted along their length. The ribs included on the second wall surface comprise a plurality of elongated rib portions, each portion spaced apart one from another across a gap between the rib portions having a gap length in the range of about 0.002–0.05". In the precision cast form of an article, the fib portions have a cross section width dimension in the range of about 0.002–0.05" and a rib portion length of at least about ten times the cross sectional width dimension of the rib portion.

DETAILED DESCRIPTION OF THE INVENTION

Figure 1:
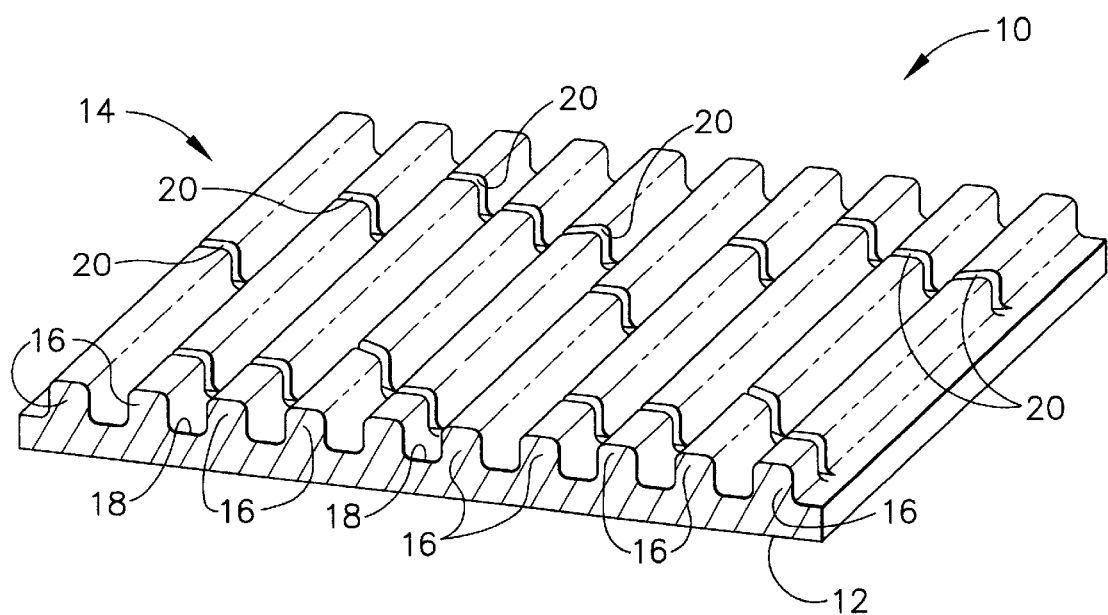
FIG. 1 is a diagrammatic, fragmentary, partially sectional perspective view of a wall of an article, such as a turbine shroud, showing a plurality of ribs including rib portions spaced a part across a gap between rib portions.

One general form of wall surface turbulators for the transfer or removal of heat from a surface has been described as a plurality of surface features such as elongated fibs extending from or of grooves generated in an article wall surface. Examples are shown and described in the above-identified Lee patent, in some embodiments related to a wall of a turbine component, for example an airfoil of a turbine blade, vane or strut; a shroud; etc. Generally, such wall features are disposed in a generally parallel array at a wall surface. Cooling fluid such as air is directed to impinge on or flow along such features to enable removal of heat from such feature to the cooler fluid. Typically, walls of such components generally have been metallic or of metal alloys. However, other materials, generally non-metallic such as ceramic or ceramic matrix composites, can be used. As mentioned above, at least one problem, detrimental to heat transfer, can exist with such an arrangement: a thermal insulating boundary layer of the cooling fluid, substantially stagnant or relatively slowly moving, can form at the interface between such a turbulator with the cooling fluid.

The present invention provides an elongated rib structure that not only disrupts the formation of such a detrimental generally insulating boundary layer but also provides a greater surface area for interaction with the cooling fluid such as air. It is well known in the art that the heat transfer rate from a convection-cooled surface is linearly proportional to the surface area and its heat transfer coefficient. Embodiments of the present invention provide greater surface area for heat transfer while enhancing the ability to transfer heat from a surface by disrupting formation of an insulating boundary layer at the surface of the rib-like turbulator.

Embodiments of the turbulators of the present invention generally are in the form of interrupted ribs defining a plurality of rib portions on a heat transfer surface or wall of an article. A rib portion can be of a variety of cross sectional shapes, for example including generally rectangular, semi-circular, triangular, etc. Ribs integral with a wall surface can be formed by a variety of commercially used methods including casting and various forms of metal removal including mechanical, electrolytic (one form of which commercially is called Electro Chemical Machining or ECM), and electric discharge (one form of which commercially is called Electro Discharge Machining or EDM) types of machining. Typically in the gas turbine art, ribs have been provided on a wall of an article such as a turbine blade or vane by precision casting, sometimes referred to in connection with the well known lost wax type of process.

The present invention defines a plurality of gaps between rib portions to provide the interrupted rib array on an article wall surface. It has been recognized during evaluation of the present invention that the gaps between cooperating or generally aligned rib portions have a gap length in the range of about 0.002–0.05", preferably in the range of about 0.005–0.02". A gap length of less than about 0.002" has been recognized to provide insufficient disruption of the above-described thermal insulating boundary layer, and in the cast form is difficult to cast at a wall. A gap length of greater than about 0.05" results in a rib portion length too small for adequate convection cooling surface. The gaps between rib portions can be in a variety of directions in respect to the rib portion itself and/or in respect to adjacent rib portions: in-line, angled, off-set, etc. However, it has been recognized during such evaluation that a combination of rib portion features provides adequate heat transfer using a judiciously selected relatively small amount of material (for example from a weight viewpoint for an aircraft engine). Such features include a rib portion having a rib cross sectional width dimension in the range of about 0.002–0.05", preferably in the range of about 0.005–0.02", and a rib portion height from the article wall surface in the range of about 0.002–0.05".

When casting is used to provide the rib portions on an article wall surface, an embodiment of the present invention includes rib portion feature ranges to result in a relatively high casting yield rate while providing sufficient rib portion material for adequate heat transfer surface. For manufacture by precision casting, it is preferred that the rib portion cross sectional width dimension be in the range of about 0.002–0.02" in combination with a rib portion length of at least about ten times such cross sectional width dimension and a rib portion height in the range of about 0.002–0.02" from the article surface. More specifically for casting to enhance yield, it is preferred that the ratio of the rib portion height to the rib portion cross sectional width dimension, sometimes called the aspect ratio, is no greater than 1.

The present invention can be more fully understood by reviewing the drawing, all the figures of which are diagrammatic. FIG. 1 is a fragmentary, partially sectional perspective view of an article wall shown generally at 10, for example the wall of a gas turbine engine turbine shroud or shroud segment disposed about rotating turbine blades. One example of such a shroud and shroud segment to which an embodiment of the present invention relates is described in U.S. Pat. No. 5,071,313—Nichols (patented Dec. 10, 1991). Another example of a turbine shroud and its supporting structure to which embodiments of the present invention relate is described in U.S. Pat. No. 5,562,408—Proctor et al. (patented Oct. 8, 1996).

In present FIG. 1, shroud 10 comprises a radially inner wall surface 12, exposed to the flowpath and elevated temperature of the engine flow stream. Substantially opposite inner wall surface 12 is a ribbed radially outer surface, shown generally at 14, along or at which a cooling fluid such as cooling air is directed during engine operation. Radially outer wall surface 14 includes an array of a plurality of generally parallel, spaced apart, interrupted ribs 16 protruding generally radially outwardly from a shroud outer surface 18 to assist in dissipation of heat from the wall into the cooling fluid. Ribs 16 can be of a variety of cross sectional shapes, for example rectangular, semicircular, triangular, etc., selected for convenience as a function of the process used for generating the ribs.

Figure 3:
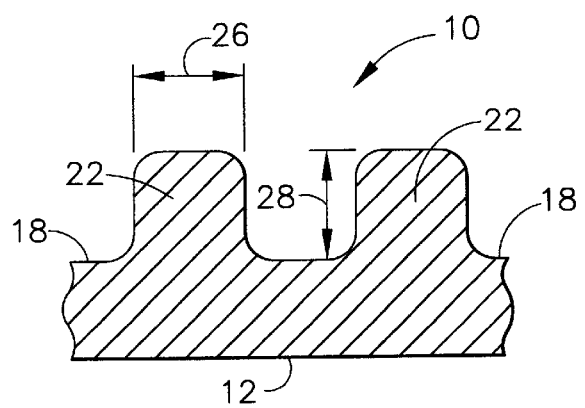
FIG. 3 is a diagrammatic fragmentary sectional view through one form of adjacent rib portions.
Figure 2:
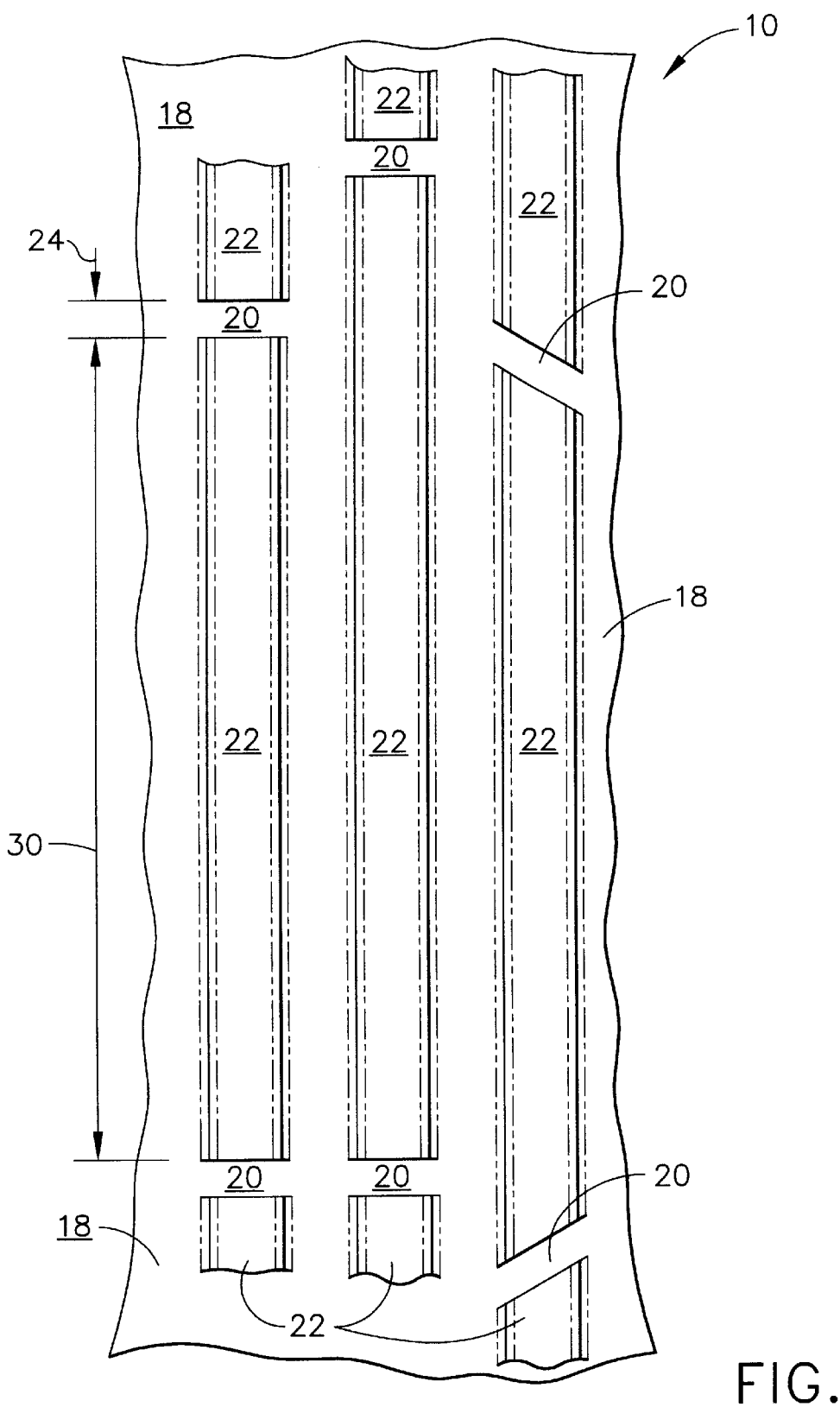
FIG. 2 is a diagrammatic fragmentary top plan view of a portion of the wall of FIG. 1 showing the rib portions and gaps therebetween.

An embodiment of the present invention is shown in more detail in the fragmentary top plan view of ribbed radially outer wall 14 in FIG. 2. In that figure, ribs 16 protruding from shroud outer surface 18 are interrupted by a plurality of gaps 20 to define a plurality of rib portions 22. Gaps 20 can be in-line one with another, can be offset between adjacent rib portions, can be disposed at various angles to the general direction of the rib portion, etc. Some examples are included in FIG. 2. However, it has been recognized in connection with the present invention that gap spacing or gap length 24 between rib portions 22, shown in FIG. 2, be in the range of about 0.002–0.05". A gap length of less than about 0.002" does not provide sufficient disruption of a boundary layer of cooling fluid flowing at or about rib portion 22 to enhance heat transfer from the rib portion. A gap length of greater than about 0.05" reduces the amount of material in the rib portion to provide surface area sufficient to enhance heat transfer from the rib portion. In addition, to provide sufficient surface area for adequate heat transfer, it is preferred that the rib portion have a rib portion height 28 as shown in FIG. 3 in the range of about 0.002–0.05". The ratio of the rib portion height 28 to the rib cross sectional width dimension 26 herein is called the aspect ratio, preferred to be no greater than about 1.

As was stated, FIG. 3 is a fragmentary sectional view of two adjacent rib portions 22 protruding from shroud surface 18 of shroud wall 10. In those embodiments of articles of the present invention made by precision casting, it has been recognized further, as shown in FIGS. 2 and 3, that a rib portion have a cross sectional width dimension 26 in the range of about 0.002–0.02", a rib portion length 30 of at least ten times the cross sectional width dimension of the rib portion, and an aspect ratio of rib portion height to rib portion cross sectional width of no greater than about 1. Such ranges are required to result in a relatively high casting yield by enabling the casting material to fill casing molds.

The present invention has been described in connection with specific examples, materials, and embodiments, including combinations of structures. However, it would be understood that they are intended to be typical of rather than in any way limiting on the scope of the invention. Those skilled in the various arts involved, for example relating to turbine engines, to high temperature materials, and to flow of fluids and heat transfer therefrom, will understand that the invention is capable of variations and modifications without departing from the scope of the apppended claims.

What is claimed is:

1. An article comprising a wall having a first wall surface subject to a first temperature, and a substantially opposite second wall surface for exposure to a cooling fluid for reducing the second wall surface to a second temperature less than the first temperature, the second wall surface including a plurality of spaced apart ribs protruding from the second wall surface to facilitate transfer of heat from the second wall surface, wherein:

the second wall surface includes interrupted ribs each comprising a plurality of elongated rib portions each spaced apart one from another across a gap between the rib portions;

the gaps between the rib portions having a gap length in the range of about 0.002–0.05".

2. The article of claim 1 in which the ribs are substantially straight and generally are aligned one with another.

3. The article of claim 1 in which the rib portions have a rib portion height from the second wall surface in the range of about 0.002–0.05".

4. The article of claim 3 in which:

the wall is a casting;

the rib portions have a rib cross sectional width dimension in the range of about 0.002–0.05";

the rib portions have a rib portion length of at least about ten times the cross sectional width dimension;

the rib portion height is in the range of about 0.002–0.02"; and an aspect ratio of the rib portion height to the rib portion cross sectional width dimension of no greater than about 1.

5. The article of claim 4 in which:

the gap lengths are in the range of about 0.005–0.02"; and, the rib cross sectional width dimensions are in the range of about 0.005–0.02".

6. The article of claim 1 in the form of a gas turbine engine shroud in which:

the first wall surface is for assembly in the engine facing generally radially inwardly of the engine at a gas flowpath of the engine; and, the second wall surface faces generally radially outwardly of the engine and at which cooling air is directed.

7. The article of claim 6 in which the rib portions have a rib portion height from the second wall surface in the range of about 0.002–0.05".

8. The article.of claim 7 in the form of a cast gas turbine engine turbine shroud segment in which:

the first wall surface is for facing and exposure to engine combustion gases; and, the rib portions on the second wall surface comprise:

a) a rib cross sectional width dimension in the range of about 0.005–0.02";

b) a gap length between spaced apart rib portions in the range of about 0.005–0.02";

c) a rib portion length of at least ten times the cross sectional width dimension;

d) a rib portion height in the range of about 0.002"0.02"; and, e) an aspect ratio of the rib portion height to the rib portion cross sectional width dimension is no greater than about 1.

9. The article of claim 1 in the form of an airfoil of a gas turbine engine component in which:

the first wall surface is an external surface of the airfoil for exposure to flowstream gasses of the engine; and, the second wall surface is an internal wall surface of the airfoil at which cooling air is directed.

10. The article of claim 9 in which the rib portion includes a rib portion height from the second wall surface in the range of about 0.002–0.05".

11. The article of claim 10 in which:

the airfoil is a casting; and, the rib portions on the second wall comprise:

a) a cross sectional width dimension in the range of about 0.005–0.02";

b) a gap length between spaced apart rib portions in the range of about 0.005–0.02";

c) a rib portion length of at least ten times the cross sectional width dimension;

d) a rib portion height in the range of about 0.002–0.02"; and, e) an aspect ratio of the rib portion height to the rib portion cross sectional width dimension of no greater than about 1.

\* \* \* \* \*